United States Patent
Cheatham, III et al.

(10) Patent No.: US 9,362,010 B2
(45) Date of Patent: Jun. 7, 2016

(54) PASSIVE REACTIVITY CONTROL APPARATUS

(71) Applicant: TerraPower, LLC, Bellevue, WA (US)

(72) Inventors: Jesse R. Cheatham, III, Seattle, WA (US); Robert A. Corbin, North Bend, WA (US); Michael E. Garrett, Richland, WA (US); John Rogers Gilleland, Kirkland, WA (US); Pavel Hejzlar, Kirkland, WA (US); Christopher J. Johns, Tacoma, WA (US); Brian C. Johnson, Renton, WA (US); Yu-Chih Ko, Bellevue, WA (US); Jon D. McWhirter, Kirkland, WA (US); Robert C. Petroski, Seattle, WA (US); K. Michael Steer, Bellevue, WA (US); Bao H. Truong, Bellevue, WA (US); James M. Vollmer, Kirkland, WA (US); Joshua C. Walter, Kirkland, WA (US); Kevan D. Weaver, Redmond, WA (US)

(73) Assignee: TerraPower, LLC, Bellevue, WA (US)

( * ) Notice: Subject to any disclaimer, the term of this patent is extended or adjusted under 35 U.S.C. 154(b) by 544 days.

(21) Appl. No.: 13/693,688

(22) Filed: Dec. 4, 2012

(65) Prior Publication Data
US 2013/0177120 A1 Jul. 11, 2013

Related U.S. Application Data

(60) Provisional application No. 61/567,609, filed on Dec. 6, 2011.

(51) Int. Cl.
  *G21C 7/22* (2006.01)
  *G21C 21/18* (2006.01)
  *G21C 5/00* (2006.01)

(52) U.S. Cl.
  CPC ........ *G21C 7/22* (2013.01); *G21C 21/18* (2013.01); *G21C 5/00* (2013.01); *Y02E 30/39* (2013.01)

(58) Field of Classification Search
  CPC ........................ G21C 7/22; G21C 7/06
  USPC ................... 376/213, 219, 220, 221, 333
  See application file for complete search history.

(56) References Cited

U.S. PATENT DOCUMENTS 3,046,212 A * 7/1962 Anderson ............... 376/221
3,151,032 A * 9/1964 Deutsch et al. ......... 376/333

(Continued)

OTHER PUBLICATIONS

PCT International Search Report; International App. No. PCT/US2012/068006; bearing a date of Aug. 16, 2013; pp. 1-2.

*Primary Examiner* — Jack W Keith
*Assistant Examiner* — Daniel Wasil

(57) ABSTRACT

In response to a change in a thermal operational parameter in a nuclear fission reactor, reactivity is controlled by driving a neutron absorption parameter modifying material to or from a region of the core of the nuclear fission reactor. The apparatus includes a driver material disposed in a first reservoir portion and a second reservoir portion of a first reservoir and connected by a first conduit. A high-Z material may be distributed in the driver material. The neutron absorption parameter modifying material is disposed in both a second reservoir and the second reservoir portion of the first reservoir. A portion of the neutron absorption parameter modifying material is in physical contact with a portion of the driver material in the second reservoir portion. The neutron absorption parameter modifying material is driveable by the driver material between the second reservoir portion and the second reservoir through a second conduit.

21 Claims, 15 Drawing Sheets

(56) References Cited

U.S. PATENT DOCUMENTS

| | | | |
|---|---|---|---|
| 3,284,307 A * | 11/1966 | Schortmann | 376/221 |
| 3,438,856 A * | 4/1969 | Ripley | 376/213 |
| 3,620,315 A * | 11/1971 | Walton | 376/328 |
| 4,971,753 A * | 11/1990 | Taylor et al. | 376/422 |
| 5,333,156 A * | 7/1994 | Lemercier | 376/219 |
| 5,684,847 A * | 11/1997 | DeFoort et al. | 376/327 |
| 5,700,962 A | 12/1997 | Carden | |
| 2004/0062340 A1 | 4/2004 | Peterson | |
| 2008/0123795 A1 | 5/2008 | Hyde et al. | |
| 2011/0069803 A1* | 3/2011 | McWhirter et al. | 376/267 |
| 2011/0110478 A1* | 5/2011 | Ahlfeld et al. | 376/213 |

* cited by examiner

PASSIVE REACTIVITY CONTROL APPARATUS

PRIORITY APPLICATIONS

For purposes of the USPTO extra-statutory requirements, the present application claims benefit of priority of U.S. Provisional Patent Application No. 61/567,609, entitled SYSTEMS AND METHODS FOR CONTROLLING REACTIVITY IN A NUCLEAR FISSION REACTOR, naming Jesse R. Cheatham, III, Robert A. Corbin, Christopher C. Johns, Brian C. Johnson, Jon D. McWhirter, Robert C. Petroski, K. Michael Steer, James M. Vollmer, Joshua C. Walter as inventors, filed 6, Dec., 2011, which was filed within the twelve months preceding the filing date of the present application or is an application of which a currently application is entitled to the benefit of the filing date.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

RELATED APPLICATIONS

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

The present disclosure relates to control of reactivity in a nuclear fission reactor.

SUMMARY

Illustrative apparatuses, assemblies, and methods for controlling reactivity in a nuclear fission reactor are disclosed, illustrative nuclear fission reactors are disclosed, and illustrative methods for fabricating a reactivity control apparatus are disclosed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
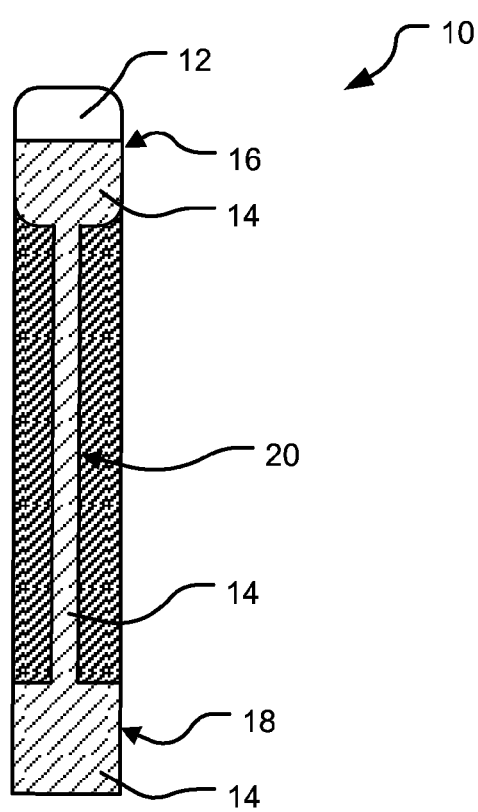
FIGS. 1A-1C are schematic illustrations of illustrative embodiments of passive reactivity control apparatuses.

In the following detailed description, reference is made to the accompanying drawings, which form a part hereof. In the drawings, similar symbols typically identify similar components, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Overview

Given by way of overview, illustrative apparatuses, assemblies, and methods for controlling reactivity in a nuclear fission reactor are disclosed, illustrative nuclear fission reactors are disclosed, and illustrative methods for fabricating a reactivity control apparatus are disclosed.

The disclosed embodiments are applicable to any nuclear fission reactors whatsoever, such as without limitation liquid metal cooled reactors, gas cooled reactors, water-cooled reactors, fast reactors, and/or thermal reactors, that experience changes in thermal operational parameters, such as without limitation at least one temperature and/or at least one flux. In response to a change in a thermal operational parameter in a nuclear fission reactor, in various embodiments reactivity in the nuclear fission reactor may be controlled by driving a neutron absorption parameter modifying material to or from a region of a core of the nuclear fission reactor. For example, and given by way of illustration and not limitation, in various embodiments the neutron absorption parameter modifying material may include: (i) a neutron absorber; (ii) a neutron moderator; and/or (iii) nuclear fuel.

In some cases as desired, the disclosed embodiments may serve as the primary means for controlling reactivity in a nuclear fission reactor. In other cases, if desired, reactivity control effected by the disclosed embodiments may be supplemented by any one or more of control rods, poisons distributed in reactor coolant, and/or reactivity effects from thermal feedback features or systems.

Still by way of overview and referring to FIG. 1A, in an illustrative embodiment a passive reactivity control apparatus 10 includes driver material 12 responsive to a nuclear fission reactor thermal operational parameter, and neutron absorption parameter modifying material 14 that is different from the driver material 12, a portion of the neutron absorption parameter modifying material 14 being in physical contact with a portion of the driver material 12, the neutron absorption parameter modifying material 14 being driveable by the driver material 12 to and from a selected portion of a nuclear fission reactor core (not shown).

In general terms, embodiments operate according to the following principles. A nuclear fission reactor (not shown) is operated and has at least one thermal operational parameter. Volume of the driver material 12 is changed in response to the thermal operational parameter (or thermal operational parameters). The driver material 12 drives the neutron absorption parameter modifying material 12 to or from the selected portion of a core of the nuclear fission reactor. A neutron absorption parameter may be modified in the selected portion of the core of the nuclear fission reactor in response to the neutron absorption parameter modifying material 12 being driven to or from the selected portion of the core of the nuclear fission reactor.

Details of non-limiting embodiments, given by way of example and not of limitation, will be set forth below.

Non-Limiting Embodiments of Passive Reactivity Control Apparatuses

Various embodiments of passive reactivity control apparatuses are disclosed. As discussed above, in some cases as desired, the disclosed embodiments may serve as the primary means for controlling reactivity in a nuclear fission reactor. In other cases, if desired, reactivity control effected by the disclosed embodiments may be supplemented by any one or more of control rods, poisons distributed in reactor coolant, and/or reactivity effects from thermal feedback features or systems.

Regardless and as desired, any one or more of some of the disclosed embodiments may operate without external input, such as without limitation electrical or mechanical input like input from a control system or a human-operator-engaged system, which enact an electromechanical function. However, it will be appreciated that, in some other embodiments, similar reactivity control functions could be achieved through interaction by any suitable system, apparatus, device, or method, such as without limitation by supplying or controlling the volume or pressure of materials such as fluids within the apparatuses or by changing configuration of the apparatuses such as housing volume, location within the core, or position of one or more housings relative to each other within one or more the apparatuses.

Non-limiting details will be set forth below by way of example and not of limitation.

Still referring to FIG. 1A and given by way of non-limiting example, in a non-limiting embodiment the passive reactivity control apparatus 10 includes the driver material 12 responsive to a nuclear fission reactor thermal operational parameter. The passive reactivity control apparatus 10 also includes the neutron absorption parameter modifying material 14 that is different from the driver material 12. A portion of the neutron absorption parameter modifying material 14 is in physical contact with a portion of the driver material 12, and the neutron absorption parameter modifying material 14 is driveable by the driver material 12 to and from a selected portion of a nuclear fission reactor core (not shown).

In some embodiments, the driver material 12 and a portion of the neutron absorption parameter modifying material 14 are disposed in a reservoir 16. Another portion of the neutron absorption parameter modifying material 14 is disposed in a reservoir 18. The reservoir 16 and the reservoir 18 are connected by a conduit 20 that also contains a portion of the neutron absorption parameter modifying material 14. The reservoir 18 is suitably located proximate a selected portion of a nuclear fission reactor core (not shown), such as an active region of the nuclear fission reactor core.

It will be appreciated that in some embodiments the apparatuses may include multiple driver materials 12, multiple neutron absorption parameter modifying materials 14, multiple reservoirs 16, and/or multiple reservoirs 18, as desired for a particular application. It will be appreciated that the driver material(s) 12, the neutron absorption parameter modifying material(s) 14, the reservoir(s) 16, and/or the reservoir(s) 18 may have varied positions relative to an active zone or region of a core of a nuclear fission reactor, such that the desired reactivity effect is achieved.

Movement of the neutron absorption parameter modifying material 14 within the device may be effected via expansion of the driver material 12. In some embodiments the volume of the reservoir 16 that holds the driver material 12 or the reservoir 18 that holds the neutron absorption parameter modifying material 14 may be changed, such as by choice and/or configuration of thermally-expanding materials or multiple materials with different thermal expansion coefficients. Given by way of non-limiting examples, the reservoir 16 may distort from its original volume due to changes in temperature, thereby forcing the driver material 12 in or out of the reservoir 16. Similar systems may be configured for the reservoir 18. Materials may be chosen for the reservoir 16 and the reservoir 18 such that the reservoir 16 and the reservoir 18 expand at different rates for a given change in temperature. A differential change in expansion may be utilized to vary the amount of either the driver material 12 or the neutron absorption parameter modifying material 14 in the reservoir 16, or the reservoir 18, or both the reservoir 16 and the reservoir 18.

Materials, including the driver material 12 and the neutron absorption parameter modifying material 14, may be selected as desired for a particular application and may depend, in part, on factors such as, without limitation, type of nuclear fission reactor and/or location within a specific nuclear fission reactor. For example and given by way of illustration and not of limitation, apparatuses for use in a light water reactor (LWR) may be constructed of alloys typically used in LWRs, such as zirconium based alloys. As a further example given by way of illustration and not of limitation, apparatuses for use in high temperature reactors, such as gas-cooled reactors, may be constructed of ceramic materials such as metal oxides, carbides, or nitrides, or refractory materials and alloys such as rhenium, tantalum, or alloys thereof.

Figure 1B:
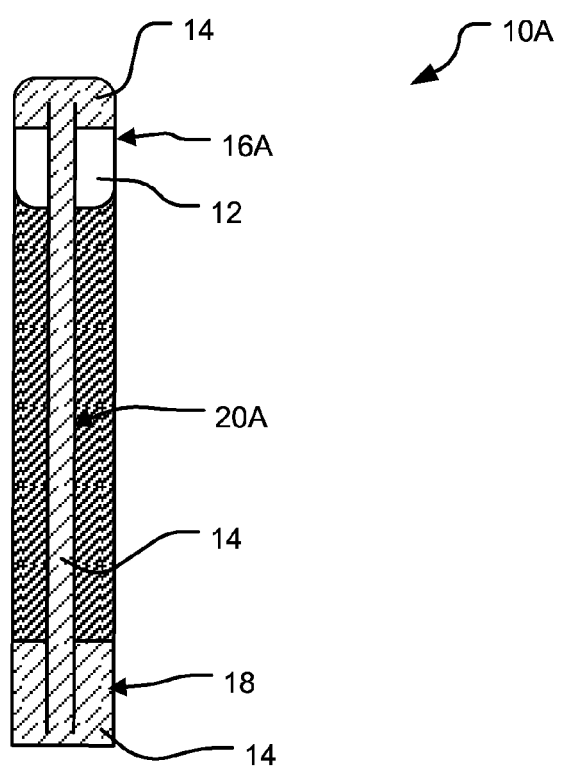

In some embodiments, the driver material 12 may include a gas. The gas suitably may be an inert (or relatively inert) gas, such as without limitation $N_2$ or $CO_2$ (or a combination thereof). The gas desirably may be a noble gas, such as without limitation He, Xe, Kr, Ar, Ne, or Rn (or a combination thereof). In embodiments in which the neutron absorption parameter modifying material 14 is a liquid, the driver material may be the liquid's vapor. For example and given by way of illustration and not of limitation, in embodiments in which the neutron absorption parameter modifying material 14 is liquid $NH_3$, the driver material may be $NH_3$ vapor In some embodiments the driver material 12 may include a liquid. Referring additionally to FIG. 1B, in a passive reactivity control apparatus 10A the driver material 12 includes a liquid. In such embodiments, the neutron absorption parameter modifying material 14 includes a liquid that is immiscible with the driver material 12. In such embodiments, the driver material 12 and the neutron absorption parameter modifying material 14 have different densities. In some instances the driver material 12 may have a higher density than the neutron absorption parameter modifying material 14, and in some other instances the driver material 12 may have a lower density than the neutron absorption parameter modifying material 14.

The driver material 12 and a portion of the neutron absorption parameter modifying material 14 are disposed in a reservoir 16A, and the reservoir 16A and the reservoir 18 are connected by a conduit 20A that also contains a portion of the neutron absorption parameter modifying material 14. All other details of the apparatus 10A are similar to those of the apparatus 10 (FIG. 1A) and need not be repeated.

It will be appreciated that any immiscible liquids may be selected for the driver material 12 and the neutron absorption parameter modifying material 14 as desired for a particular application. Liquid for the neutron absorption parameter modifying material 14 in an apparatus 10A deployed in an LWR suitably may be a low melting point liquid metal, or an aqueous or organic solution, such as borated water. Additional factors that may also contribute to determining suitability of immiscible liquids for use as the driver material 12 and the neutron absorption parameter modifying material 14 may also include temperature and/or pressure constraints, neutronic inertness properties of a liquid selected for the driver material 12, chemical reactiveness between the liquids selected for the driver material 12 and the neutron absorption parameter modifying material 14, and ability of the neutron absorption parameter modifying material 14 to modify neutron absorption parameters. Within such a context, immiscible liquids such as aqueous solutions, oil, organic solutions, and liquid metals may be selected as desired for a particular application.

Figure 1C:
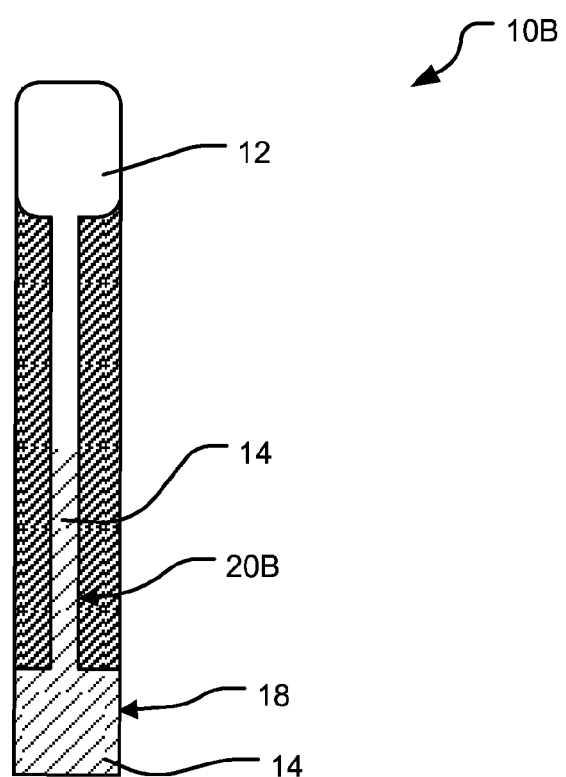

In some embodiments and referring now to FIGS. 1A and 1C, the driver material 12 may include a solid. In some embodiments (as shown in FIG. 1A), the solid driver material 12 and a portion of the neutron absorption parameter modifying material 14 are disposed in the reservoir 16. In some of these embodiments, thermal expansion or contraction of the solid driver material 12 may directly drive the neutron absorption parameter modifying material 14. In some of these embodiments, thermal expansion or contractor of the solid driver material 12 may alter geometry of the reservoir 16, thereby driving the neutron absorption parameter modifying material 14. All other details have been described above and need not be repeated.

In some other embodiments (as shown in FIG. 1C), in a passive reactivity control apparatus 10B the solid driver material 12 need not be provided in a reservoir (but may be provided in a reservoir, if desired. A portion of the neutron absorption parameter modifying material 14 is in physical contact with a portion of the solid driver material 12, such as in a conduit 20B. In some of these embodiments, thermal expansion or contraction of the solid driver material 12 may directly drive the neutron absorption parameter modifying material 14. All other details of the apparatus 10B are similar to those of the apparatus 10 (FIG. 1A) and need not be repeated.

In embodiments in which the driver material 12 is a solid, the solid may be selected as desired for a particular application. For example, suitability criteria may include thermal expansion properties, neutronic inertness, corrosion properties, chemical inertness, susceptibility to radiation damage, and the like. Given by way of non-limiting examples, suitable solids may include a ferritic martensitic steel (such as HT9 and D9) and/or a zirconium alloy.

Referring now to FIGS. 1A, 1B, and 1C, the nuclear fission reactor thermal operational parameter may one or more temperatures such as reactor coolant temperature, reactor coolant vapor temperature, and/or fuel temperature. Thermal energy from the apparatuses is conducted into the driver material 12, thereby causing thermal expansion or contraction of the driver material 12. In addition, indirect measures of physical temperature and, accordingly, the nuclear fission reactor thermal operational parameter, includes neutron flux, beta flux, gamma flux, and neutrino flux. These flux parameters are proportional to temperature of physical material in a reactor core (not shown) or changes in these flux parameters could be indicative of a changing thermal parameter.

It will be appreciated that a neutron absorption parameter that is modifiable by the neutron absorption parameter modifying material 14 includes reactor average macroscopic absorption cross-section. As is known, absorption cross-section is primarily fixed for each isotope for a given spectrum of a reactor core. Use of an average value accounts for physical quantity changes of the neutron absorption parameter modifying material 14 moving into and out of the core. The reactor average macroscopic absorption cross-section is suitably a fuel assembly average neutron cross-section, a control material average cross-section, a local average cross-section, a coolant average cross-section, and the like. The reactor average macroscopic cross-section is the measure of the cross-section that includes the atomic number density. In other words, the reactor average macroscopic cross-section may be considered a "local" or "global" macroscopic cross-section.

In some embodiments, the neutron absorption parameter modifying material 14 may include a neutron absorber. Any neutron absorber may be selected as desired for a particular application. Given by way of example only and not of limitation, the neutron absorber suitably may include any one or more of In, Li-6, Eu, Ag, Dy, B, Hf, Gd, Pm, Cd, Sm, binary combinations thereof, and eutectic combinations thereof. In some embodiments, the neutron absorber suitably may be suspended in a carrier fluid. Suitable carrier fluids may include aqueous fluids, liquid metals, and organic fluids (and may be subject to one or more constraints discussed above if the driver material 12 is an immiscible liquid).

In some embodiments in which the neutron absorption parameter modifying material 14 includes a neutron absorber and referring now to FIG. 1A, the neutron absorber may include nuclear fission fuel material. The construction of the passive reactivity control apparatus 10 is the same as described above. However, in these embodiments the reservoir 16 is suitably located proximate the selected portion of the nuclear fission reactor core (not shown), such as an active region of the nuclear fission reactor core. As such, during power transients in which power in the active region of the reactor core increases, the response thereto by the driver material 12 drives the nuclear fission fuel material (that is the neutron absorption parameter modifying material 14) out of the active region of the reactor core. In these embodiments, the nuclear fission fuel material may include any one or more suitable nuclear fission fuel material such as without limitation U dissolved in Pb, U—Fe, U—Mn, Pu—Mn, U—Cr, Pu—Cr, Pu—Fe eutectic, and/or Pu—Mg eutectic.

Referring now to FIGS. 1A, 1B and 1C, in some embodiments a neutron absorption parameter that is modifiable by the neutron absorption parameter modifying material 14 includes neutron spectrum. In such embodiments, the neutron absorption parameter modifying material 14 includes a moderator. It will be appreciated that insertion or extraction of a moderator locally softens or hardens the neutron spectrum and induces a greater or a lesser rate of absorptions in any of the fertile material, fission products, and structure, and hence reduces or increases the neutron population in the vicinity of the inserted moderator. Suitable moderators include any one or more of Li-7, C, SiC, a hydrogenous material, water, ammonia, acetone, a metal hydride, a metal deuteride, a suspension of carbon in water, and a suspension of SiC in water.

Still referring to FIGS. 1A, 1B and 1C, in some embodiments rate effects may be tailored to a nuclear fission reactor design such that reactivity changes established by the apparatuses occur more quickly or more slowly for a given reactor. This may be achieved in some embodiments by placing materials with known thermal resistances at various locations on or in the apparatus in order to enhance (or otherwise affect) heat transfer to the driver material 12. In some reactors that have low thermal inertia, it may be desirable to affect faster heat transfer to the apparatuses in order to counteract rapid temperature changes in the reactor core. The opposite may be desirable for reactors with large amounts of thermal inertia, such as large pool-type nuclear fission reactors.

In various embodiments, it may be desirable to transfer thermal energy to the apparatuses via conduction, convection, or radiative heat transfer. In the case of conduction, solid material with desired heat transfer capabilities may be deployed to affect the rate of heat transfer between the heat producing region of the reactor core and the driver material 12. Thermal fluids may also be used to enhance heat transfer from heat producing regions to the driver material 12. Such a thermal fluid may be a liquid metal, such as sodium, which may be directed via pressure differential and physical flow channel(s) to the apparatuses.

Radiative heat transfer may transfer thermal energy to the driver material 12, the neutron absorption parameter modifying material 14, and/or associated structure of the apparatuses. Gamma or neutron radiation emitted from the active region of the nuclear fission reactor may deposit energy within the apparatuses without or in addition to conduction or convection between the active region of the reactor core and the apparatus. Materials, such as metallic wool or foam that attenuate such radiation, may be deployed within the apparatuses. These materials may then absorb the radiant energy and induce thermal expansion effects either directly, such as via radiative heating of the driver material 12 or the neutron absorption parameter modifying material 14, or indirectly, such as via radiant heating of the apparatus' structure or the reservoirs 16 and/or 18, which then convect or conduct heat to the driver material 12 and/or the neutron absorption parameter modifying material 14.

In some embodiments, materials may be placed within the apparatuses such that the desired radiation attenuation is obtained. For example, tungsten wool may be placed within the driver material 12 for attenuating gamma radiation, thereby producing enhanced gamma heating within the apparatuses and helping to achieve prompt response to a power increase. As is known, tungsten has a high density and a small specific heat, and low density tungsten wool has a large surface to volume ratio. Accordingly, a small volume of tungsten can result in a rapid heat transfer from heated wool into the driver material 12. Moreover, tungsten wool heating is prompt from gamma heating; hence overall delay in heating response is very small. Other materials may be used as desired for a particular application, such as without limitation: a glass or ceramic wool; borated glass; and/or strands of ceramic material, such as silicone carbide. Neutron absorbers, such as boron, may also be used to produce similar effects. In some cases, it may be desirable to use materials substantially transparent to radiation (for example, zirconium or iron) such that the apparatus' response is less a function of the radiative environment and more a function of the conductive and convective heat transfer environment. To that end, in some embodiments high-Z material may be distributed in the driver material 12. In such cases, the high-Z material may include any one or more materials such as W wool, Ta, Au, Ag, Re, and/or Os.

Figure 2A:
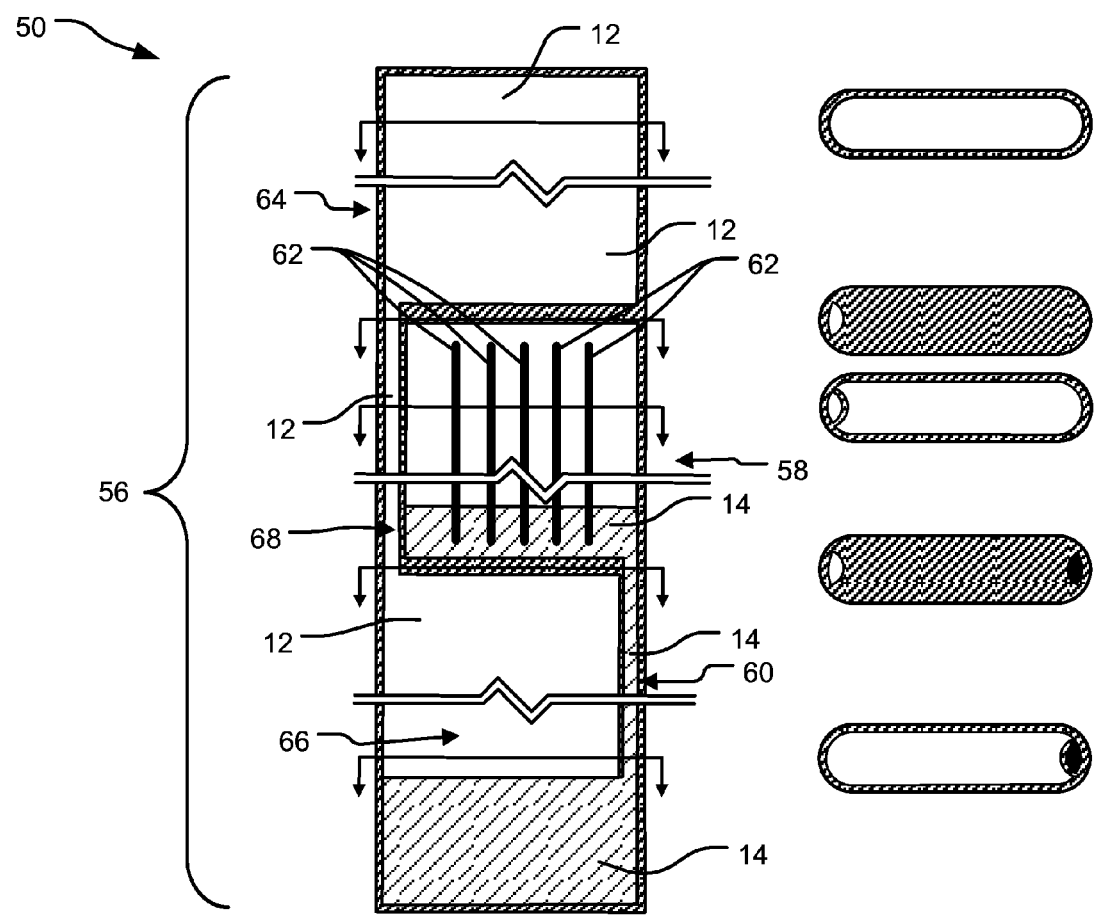
FIG. 2A is a schematic illustration of another illustrative embodiment of a passive reactivity control apparatus.

Additional embodiments of passive reactivity control apparatuses will be discussed by way of illustration and not of limitation. In an embodiment and referring now to FIG. 2A and by way of overview, a passive reactivity control apparatus 50 is disclosed. The apparatus 50 may be implemented in nuclear fission reactors that encounter sodium void worth, such as a sodium-cooled liquid metal fast breeder reactor and a sodium-cooled travelling wave reactor.

As is known, it is desirable to have a negative temperature coefficient of reactivity at all operating temperatures or even off-normal temperatures (such as might be experienced in an accident condition.) It is also desirable to understand how the reactivity coefficients change with temperature. The strongest non-linear effects are the expansion of sodium and Doppler. Radial expansion is also expected to be non-linear. The result of these effects is that at higher temperatures, the temperature coefficient of reactivity becomes more positive. The effect of sodium leaving the core is assumed to be linear per unit mass. The coolant temperature coefficient becomes more positive at higher temperatures because each degree removes a larger of fraction of sodium than the previous degree. The overall effect is a strengthening of about 10% from operating temperatures to boiling.

Given by way of illustration and not of limitation, embodiments of the passive reactivity control apparatus 50 include a reservoir 56 and a reservoir 58 that is spaced apart from the reservoir 56. A conduit 60 is interposed between the reservoir 56 and the reservoir 58. The driver material 12 is disposed in the reservoir 56, and the driver material 12 is responsive to a nuclear fission reactor thermal operational parameter. The neutron absorption parameter modifying material 14 is disposed in the reservoir 56. The neutron absorption parameter modifying material 14 is different from the driver material 12. A portion of the neutron absorption parameter modifying material 14 is in physical contact with a portion of the driver material 12. The neutron absorption parameter modifying material 14 is driveable by the driver material 12 between the reservoir 56 and the reservoir 58.

The apparatus 50 may passively control reactivity and/or augment negative temperature coefficient by: a) driving the neutron absorption parameter modifying material 14 into or out of a high-worth region of the core; b) driving a neutron moderator into or out of a region of the core; and/or c) removing nuclear fission fuel material from the core.

Illustrative details of embodiments of the passive reactivity control apparatus 50 will now be discussed by way of illustration.

In some embodiments the reservoir 58 is disposed in a selected portion of a nuclear fission reactor core, such as an active region of the reactor core. The reservoir 58 is disposed in the active region of the reactor core in embodiments of the passive reactivity control apparatus 50 in which reactivity is passively controlled and/or negative temperature coefficient is augmented by: a) driving the neutron absorption parameter modifying material 14 into or out of a high-worth region of the core; and/or b) driving a neutron moderator into or out of a region of the core. In other embodiments of the passive reactivity control apparatus 50 in which reactivity is passively controlled and/or negative temperature coefficient is augmented by removing nuclear fission fuel material from the core, the reservoir 56 is disposed in the active region of the reactor core.

In some embodiments, if desired one or more members 62 may be disposed in the reservoir 58. In such embodiments, the members 62 act as "anti-slosh vanes" that are arranged to mitigate free-surface effect in the reservoir 58.

In some embodiments, the reservoir 56 includes a portion 64, a portion 66 spaced apart from the portion 64, and a conduit 68 interposed between the portion 64 and the portion 66. The reservoir 58 is interposed between the portion 64 and the portion 66. The driver material 12 may be disposed in the portion 64, the portion 66, and the conduit 68.

All other details regarding the driver material 12 and the neutron absorption parameter modifying material 14 are the same as those that have been set forth above regarding other embodiments of apparatuses (FIGS. 1A-1C). Those details are incorporated by this reference and need not be repeated for an understanding.

Figure 2B:
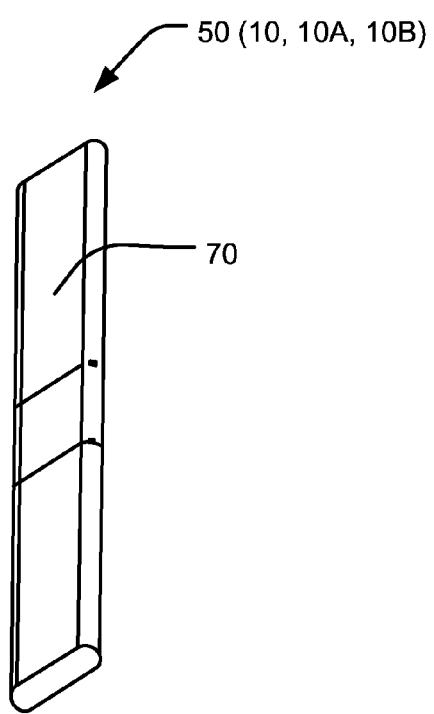
FIG. 2B is a perspective view of the passive reactivity control apparatus of FIG. 2A.

Referring additionally to FIG. 2B, in some embodiments the passive reactivity control apparatus 50 may be disposed in a housing 70. Structural materials for the passive reactivity control apparatus 50 and the housing 70 may be selected as desired for a particular application and may depend, in part, on factors such as, without limitation, type of nuclear fission reactor and/or location within a specific nuclear fission reactor. For example and given by way of illustration and not of limitation, the passive reactivity control apparatus 50 and the housing 70 for use in a light water reactor (LWR) may be constructed of alloys typically used in LWRs, such as zirconium based alloys. As a further example given by way of illustration and not of limitation, the passive reactivity control apparatus 50 and the housing 70 for use in high temperature reactors, such as gas-cooled reactors, may be constructed of ceramic materials such as metal oxides, carbides, or nitrides, or refractory materials and alloys such as rhenium, tantalum, or alloys thereof. It will be appreciated that any of the passive reactivity control apparatuses 10, 10A, and/or 10B (FIGS. 1A, 1B, and 1C) may be disposed in the housing 70, as desired for a particular application.

Figure 2C:
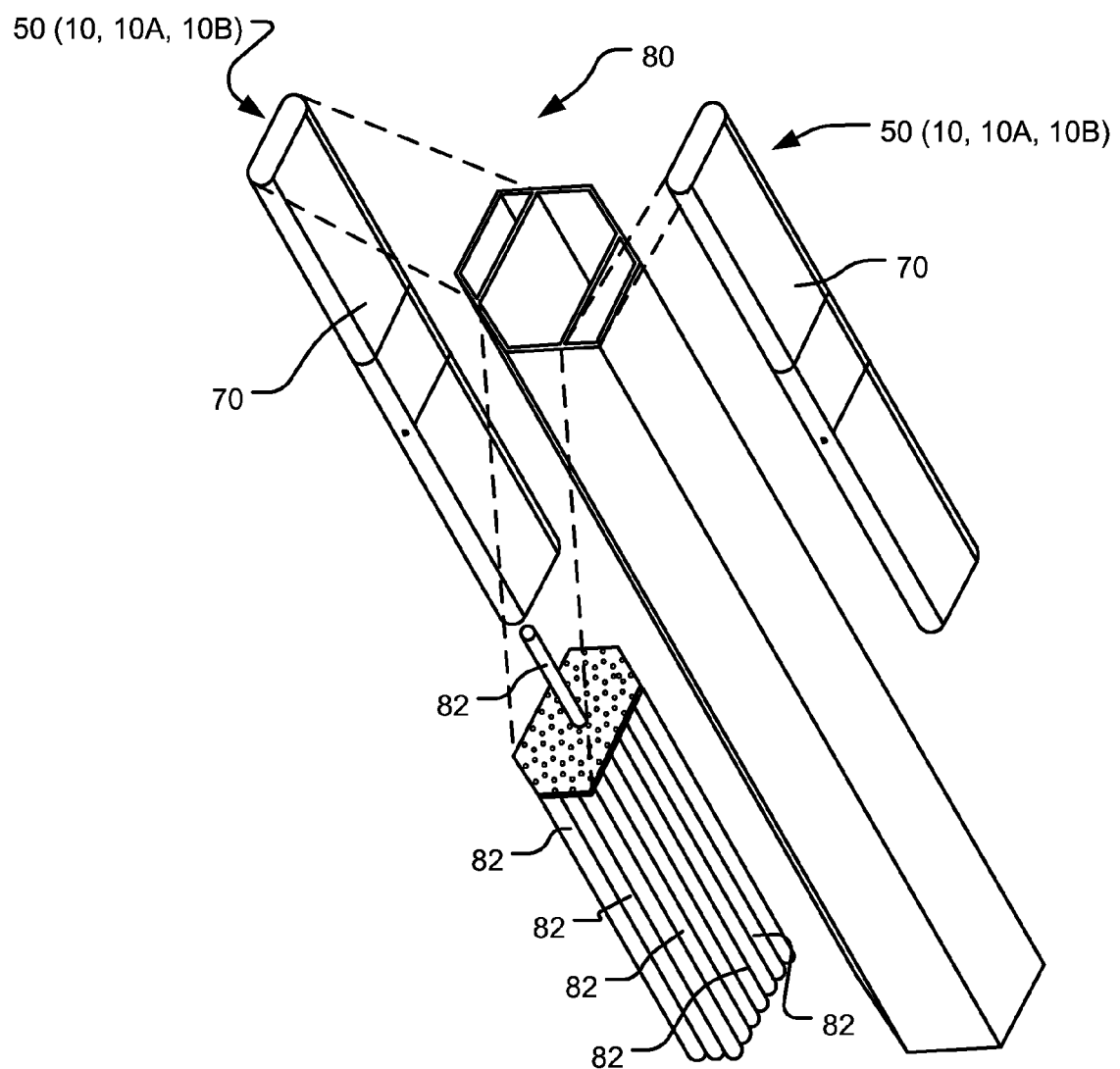
FIG. 2C is an exploded perspective view of an illustrative reactivity control apparatus.

Referring additionally to FIG. 2C, in some embodiments an illustrative reactivity control apparatus 80 includes one or more neutron absorber members 82, such as without limitation control rods or safety rods, and one or more passive reactivity control apparatuses 50 disposed in fixed spatial relationship to the neutron absorber member(s) 82. For example, the neutron absorber member(s) 82 and the passive reactivity control apparatus(es) 50 may be disposed in a housing 84, such as without limitation a duct. A drive mechanism (not shown in FIG. 2C) may be operatively coupled to the neutron absorber member(s) 82. It will be appreciated that any of the passive reactivity control apparatuses 10, 10A, and/or 10C (FIGS. 1A, 1B, and 1C) may be included in the reactivity control apparatus 80, as desired for a particular application. Details regarding the passive reactivity control apparatuses 10, 10A, 10B (FIGS. 1A, 1B, and 1C) and 50 (FIG. 2A) have been set forth above, are incorporated by this reference, and need not be repeated for an understanding.

Figure 3:
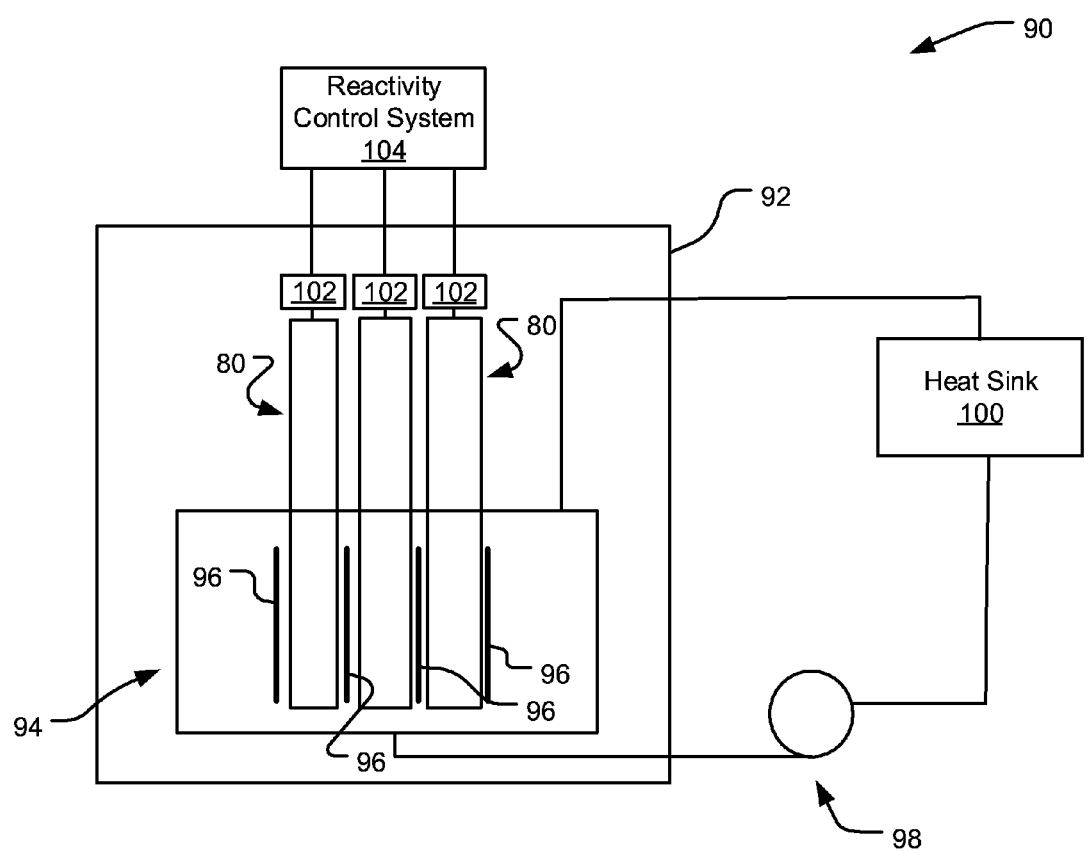
FIG. 3 is a schematic illustration of an illustrative nuclear fission reactor.

Referring additionally to FIG. 3, in some embodiments an illustrative nuclear fission reactor 90 includes a reactor vessel 92. A reactor core 94 is disposed in the reactor vessel 92. The reactor core 94 includes one or more nuclear fission fuel assemblies 96. The nuclear fission reactor 90 also includes a reactor coolant system 98 that is operatively coupled to the reactor core 94. A heat sink 100 is operatively coupled to the reactor core 94 and the reactor coolant system 98. The heat sink 100 transfers heat from reactor coolant exiting the reactor core 94 to any desired energy conversion device, converts heat from the reactor coolant to work such as electricity generation and/or propulsion motive force, and returns cooled reactor coolant to the reactor coolant system 98. As is known, the heat sink 100 may include without limitation one or more intermediate heat exchangers in the context of a liquid-metal-cooled reactor, one or more steam generators and associated condensers, one or more steam-driven turbines for generating electricity and/or propulsion motive force, one or more gas-driven turbines in the context of a gas-cooled reactor, and/or the like. It will be appreciated that the nuclear fission reactor 90 may include any type of nuclear fission reactor whatsoever. No limitations regarding type of nuclear fission reactor are intended and none are to be inferred. Given by way of nonlimiting examples by way of illustration and not of limitation, the nuclear fission reactor 90 may include a thermal spectrum reactor, a fast spectrum reactor, a breeder reactor, a traveling wave (breed and burn) reactor, a gas-cooled reactor, a liquid-metal-cooled reactor, a water cooled reactor (such as a pressurized water reactor and/or a boiling water reactor), a pool-type reactor, or a loop-type reactor.

The nuclear fission reactor 90 includes one or more reactivity control apparatuses 80. As discussed above, the reactivity control apparatus(es) 80 includes one or more neutron absorber members 82, such as without limitation control rods or safety rods, and one or more passive reactivity control apparatuses 50 disposed in fixed spatial relationship to the neutron absorber member(s) 82. As also discussed above, it will be appreciated that any of the passive reactivity control apparatuses 10, 10A, and/or 10C (FIGS. 1A, 1B, and 1C) may be included in the reactivity control apparatus 80, as desired for a particular application. One or more drive mechanisms 102 may be operatively coupled to the neutron absorber member(s) 82 as desired. The drive mechanism(s) 102 is operatively coupled to a reactivity control system 104 for controlling insertion and/or extraction of the neutron absorber member(s) 82 by the drive mechanism 102.

Illustrative Methods

Now that illustrative embodiments of passive reactivity control apparatuses, reactivity control apparatuses, and nuclear fission reactors have been discussed, illustrative methods will be discussed by way of non-limiting examples. Embodiments of the methods may be used in association with embodiments of the apparatuses 10, 10A, 10B, and 50 and the nuclear fission reactor 90. Details of the apparatuses 10, 10A, 10B, and 50 and the nuclear fission reactor 90 have been set forth above, are incorporated by this reference, and need not be repeated for an understanding of embodiments of the illustrative methods.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 4A:
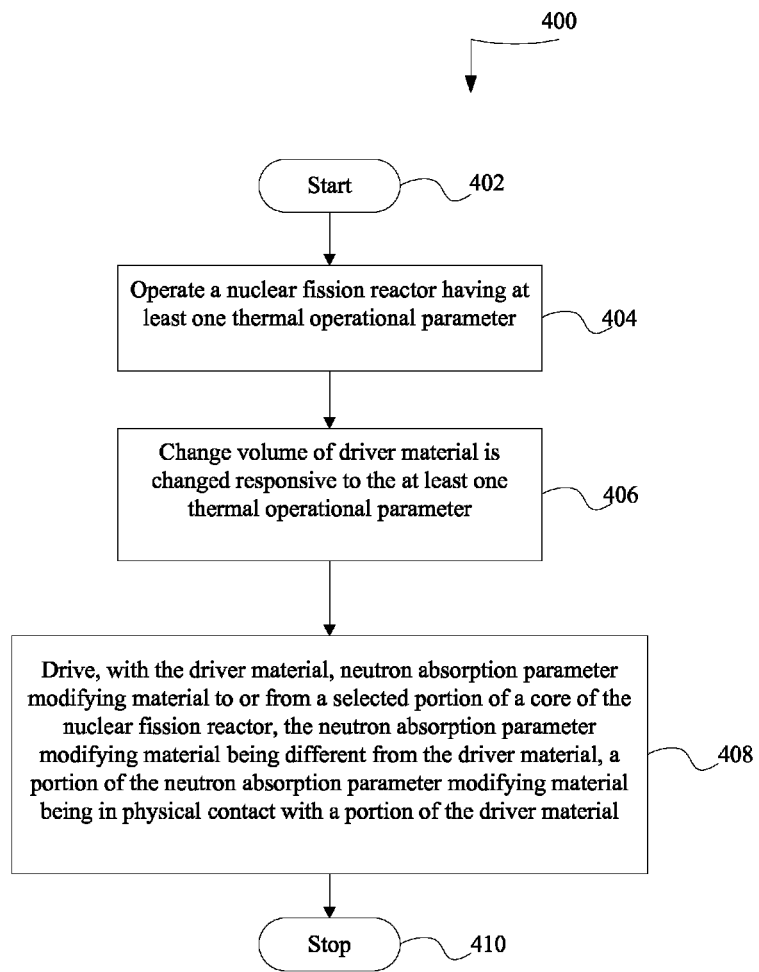
FIG. 4A is a flowchart of an illustrative method of controlling reactivity in a nuclear fission reactor.

Referring now to FIG. 4A, an illustrative method 400 is provided for controlling reactivity in a nuclear fission reactor. The method 400 starts at a block 402. At a block 404 a nuclear fission reactor is operated, and the nuclear fission reactor has at least one thermal operational parameter. At a block 406 volume of driver material is changed responsive to the at least one thermal operational parameter. At a block 408 neutron absorption parameter modifying material is driven, with the driver material, to or from a selected portion of a core of the nuclear fission reactor, the neutron absorption parameter modifying material being different from the driver material, a portion of the neutron absorption parameter modifying material being in physical contact with a portion of the driver material. The method 400 stops at a block 410.

Figure 4B:
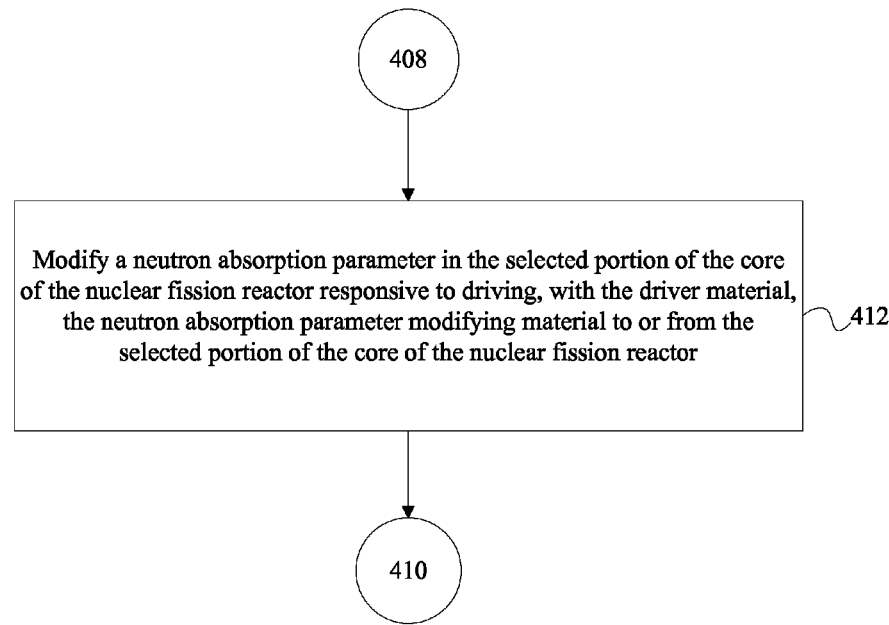
FIGS. 4B-4D illustrate details of the method of the flowchart of FIG. 4A.

Referring additionally to FIG. 4B, in some embodiments at a block 412 a neutron absorption parameter may modified in the selected portion of the core of the nuclear fission reactor responsive to driving, with the driver material, the neutron absorption parameter modifying material to or from the selected portion of the core of the nuclear fission reactor.

In some embodiments, the nuclear fission reactor thermal operational parameter may include at least one temperature chosen from reactor coolant temperature, reactor coolant vapor temperature, and fuel temperature. In some embodiments, the nuclear fission reactor thermal operational parameter may include at least one flux chosen from neutron flux, beta flux, gamma flux, and neutrino flux.

Figure 4C:
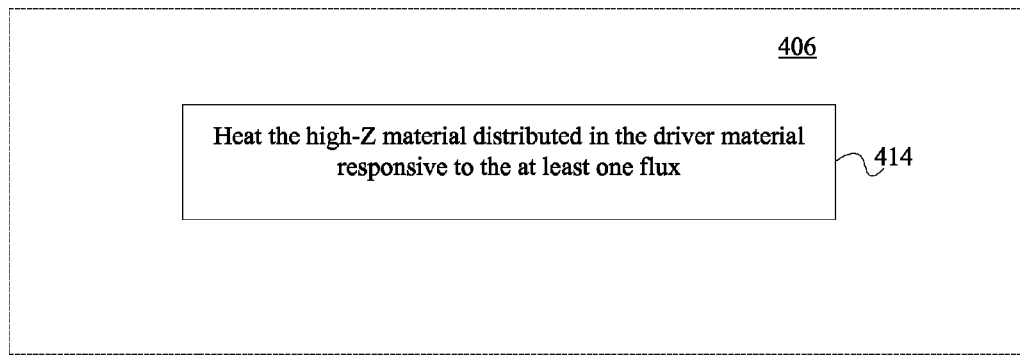

In some embodiments, the driver material may include high-Z material distributed therein. In such embodiments and referring additionally to FIG. 4C, changing volume of driver material responsive to the thermal operational parameter at the block 406 may include heating the high-Z material distributed in the driver material responsive to the at least one flux at a block 414.

Figure 4D:
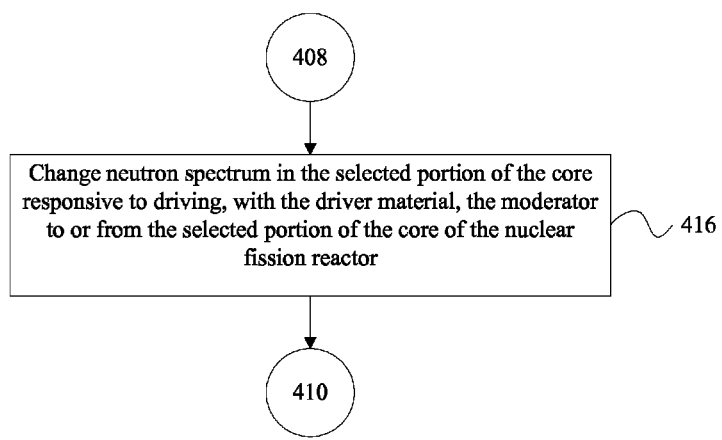

In some embodiments, the neutron absorption parameter modifying material may include a moderator. In such embodiments and referring additionally to FIG. 4D, at a block 416 the neutron spectrum may be changed in the selected portion of the core responsive to driving, with the driver material, the moderator to or from the selected portion of the core of the nuclear fission reactor.

Figure 5A:
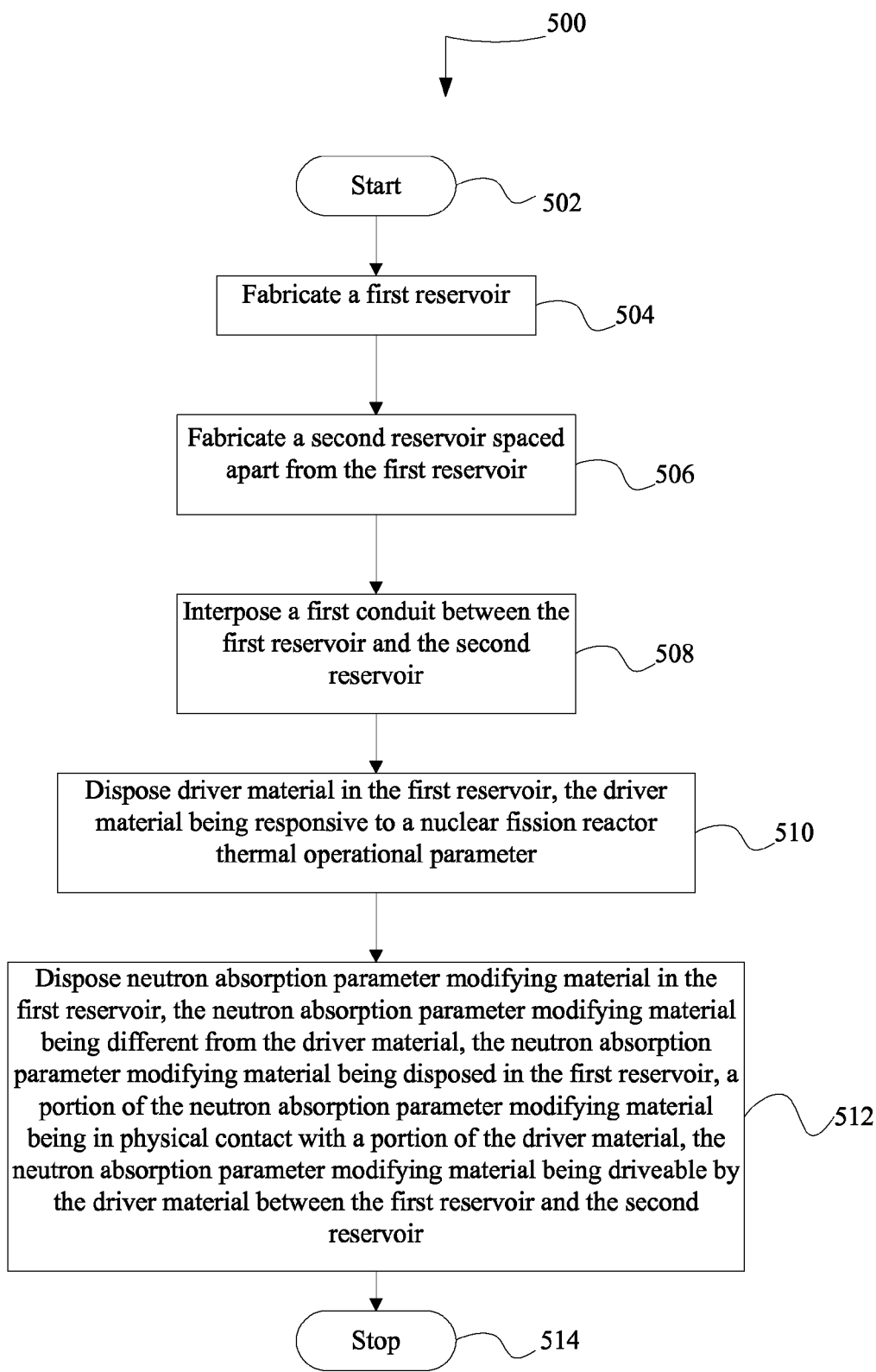
FIG. 5A is a flowchart of an illustrative method of fabricating a passive reactivity control apparatus.

Referring now to FIG. 5A, an illustrative method 500 is provided for fabricating a passive reactivity control apparatus. The method 500 starts at a block 502. At a block 504 a first reservoir is fabricated. At a block 506 a second reservoir spaced apart from the first reservoir is fabricated. At a block 508 a first conduit is interposed between the first reservoir and the second reservoir. At a block 510 driver material is disposed in the first reservoir, the driver material being responsive to a nuclear fission reactor thermal operational parameter. At a block 512 neutron absorption parameter modifying material is disposed in the first reservoir, the neutron absorption parameter modifying material being different from the driver material, the neutron absorption parameter modifying material being disposed in the first reservoir, a portion of the neutron absorption parameter modifying material being in physical contact with a portion of the driver material, the neutron absorption parameter modifying material being driveable by the driver material between the first reservoir and the second reservoir. The method 500 stops at a block 514.

Figure 5B:
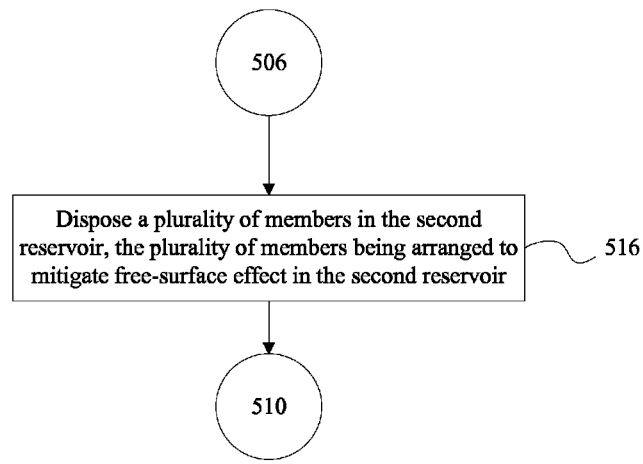
FIGS. 5B-5D illustrate details of the method of the flowchart of FIG. 5A.

Referring additionally to FIG. 5B, in some embodiments at a block 516 a plurality of members may be disposed in the second reservoir, the plurality of members being arranged to mitigate free-surface effect in the second reservoir.

Figure 5C:
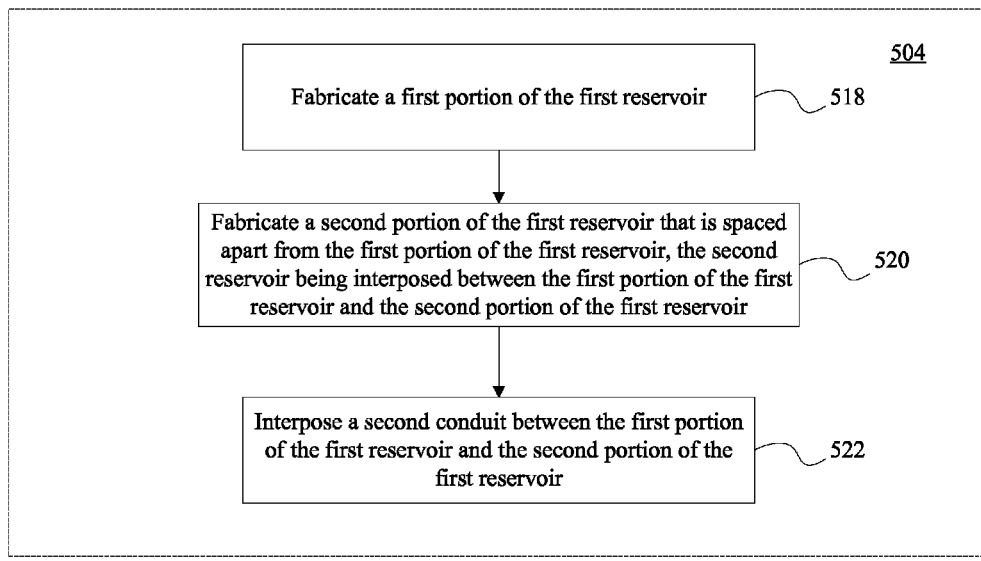

In some embodiments and referring additionally to FIG. 5C, fabricating a first reservoir at the block 504 may include fabricating a first portion of the first reservoir at a block 518, fabricating a second portion of the first reservoir that is spaced apart from the first portion of the first reservoir at a block 520, the second reservoir being interposed between the first portion of the first reservoir and the second portion of the first reservoir, and interposing a second conduit between the first portion of the first reservoir and the second portion of the first reservoir at a block 522.

Figure 5D:
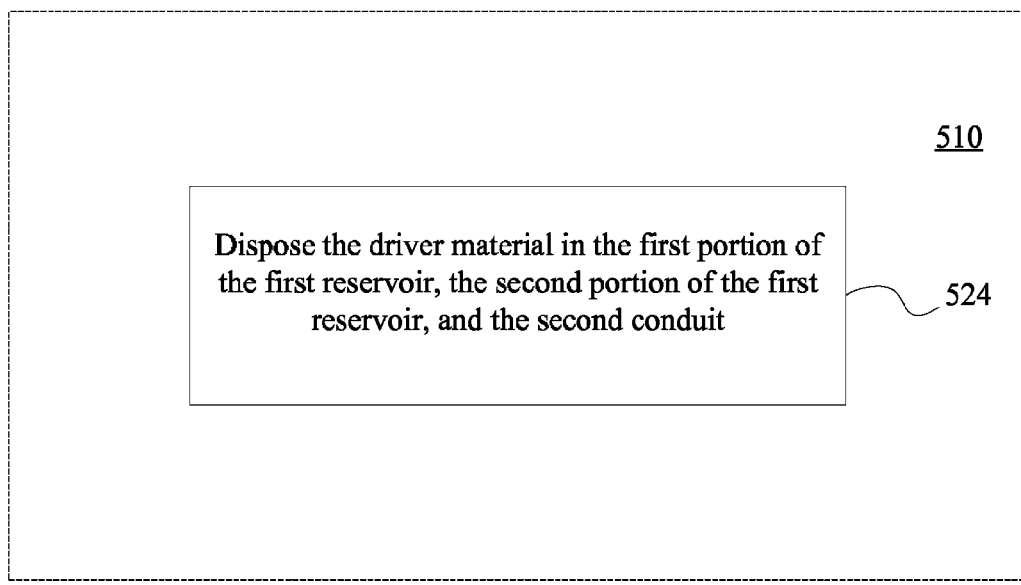

In some embodiments and referring additionally to FIG. 5D, disposing driver material in the first reservoir at the block 510 may include disposing the driver material in the first portion of the first reservoir, the second portion of the first reservoir, and the second conduit at a block 524.

Figure 6A:
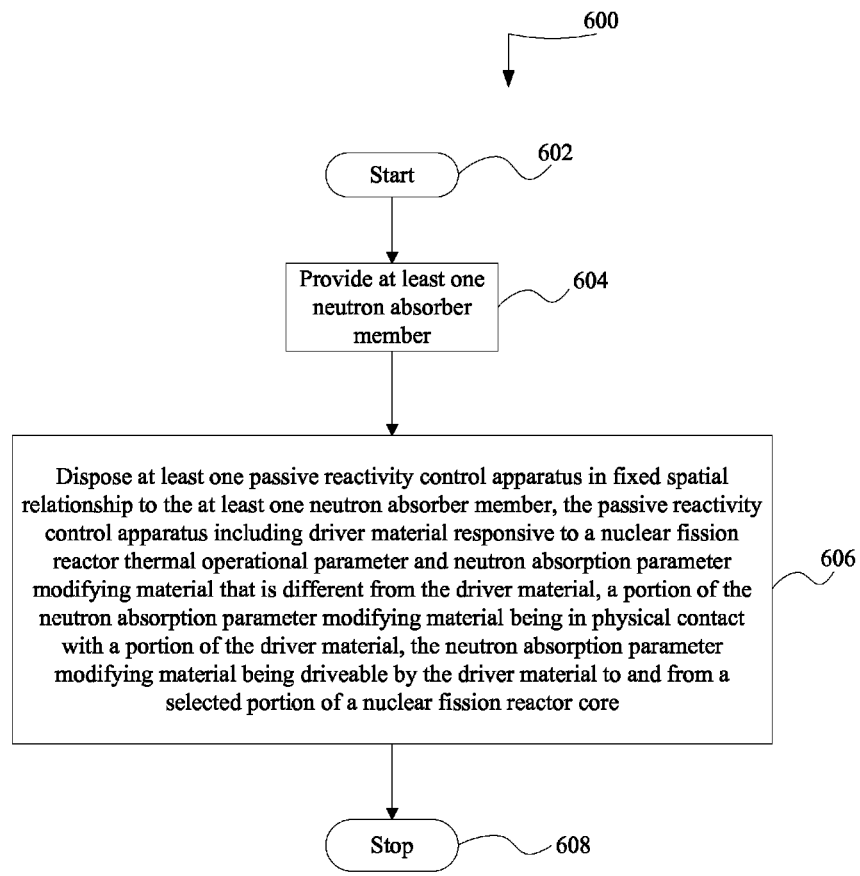
FIG. 6A is a flowchart of an illustrative method of fabricating a reactivity control apparatus.

Referring now to FIG. 6A, an illustrative method 600 is provided for fabricating a reactivity control apparatus. The method 600 starts at a block 602. At a block 604 at least one neutron absorber member is provided. At a block 606 at least one passive reactivity control apparatus is disposed in fixed spatial relationship to the at least one neutron absorber member, the passive reactivity control apparatus including driver material responsive to a nuclear fission reactor thermal operational parameter and neutron absorption parameter modifying material that is different from the driver material, a portion of the neutron absorption parameter modifying material being in physical contact with a portion of the driver material, the neutron absorption parameter modifying material being driveable by the driver material to and from a selected portion of a nuclear fission reactor core. The method 600 stops at a block 608.

Figure 6B:
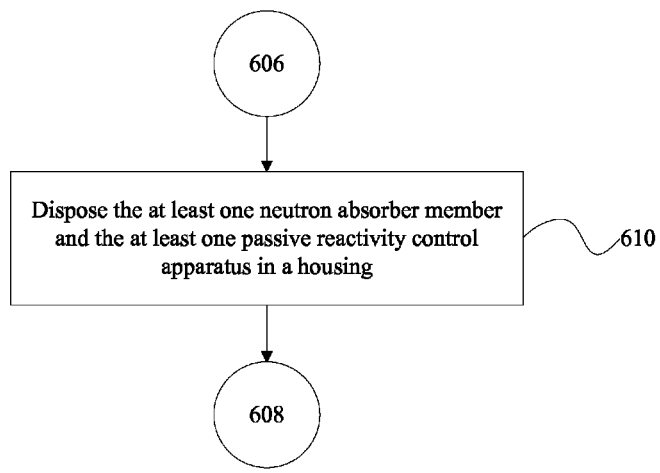
FIGS. 6B-6C illustrate details of the method of the flowchart of FIG. 6A.

Referring additionally to FIG. 6B, in some embodiments at a block 610 the at least one neutron absorber member and the at least one passive reactivity control apparatus may be disposed in a housing.

Figure 6C:
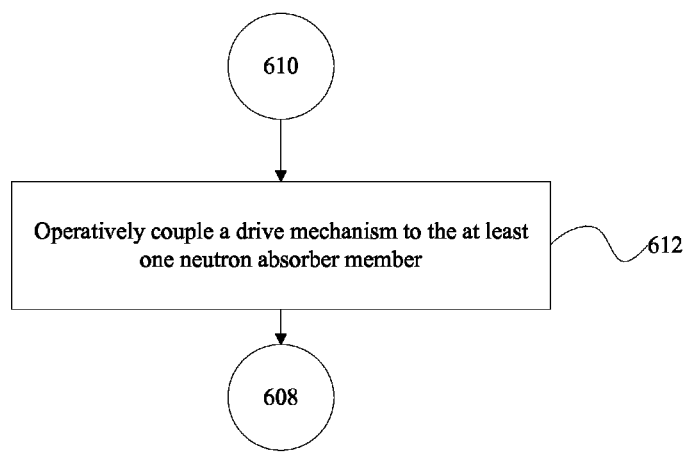

Referring additionally to FIG. 6C, in some embodiments at a block 612 a drive mechanism may be operatively coupled to the at least one neutron absorber member.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A passive reactivity control apparatus comprising:
   a first reservoir having a first reservoir portion and a second reservoir portion, the first reservoir portion and the second reservoir portion being spaced apart;
   a first conduit interposed between and fluidly connecting the first reservoir portion and the second reservoir portion of the first reservoir;
   a second reservoir spaced apart from the first reservoir, the second reservoir interposed between the first reservoir portion and the second reservoir portion of the first reservoir, the second reservoir being located within a selected portion of a nuclear fission reactor core;
   a second conduit interposed between and fluidly connecting the second reservoir portion and the second reservoir;
   a driver material disposed in the first reservoir portion and the second reservoir portion of the first reservoir and the first conduit, a volume of the driver material thermally expanding and contracting in response to an increase and decrease of a nuclear fission reactor thermal operational parameter, respectively; and
   a neutron absorption parameter modifying material disposed in the second reservoir portion and the second reservoir, the neutron absorption parameter modifying material being different from the driver material, a portion of the neutron absorption parameter modifying material being in physical contact with a portion of the driver material in the second reservoir portion, the neutron absorption parameter modifying material being driveable by the driver material from the second reservoir portion to the second reservoir through the second conduit upon expansion of the volume of the driver material, the neutron absorption parameter modifying material being drivable by the driver material from the second reservoir to the second reservoir portion through the second conduit upon contraction of the volume of the driver material.

2. The apparatus of claim 1, further comprising a plurality of members disposed in the second reservoir, the plurality of members being arranged to mitigate free-surface effect in the second reservoir.

3. The apparatus of claim 1, wherein the driver material includes a gas.

4. The apparatus of claim 3, wherein the gas includes at least one gas chosen from He, Xe, Kr, Ar, Ne, Rn, N2, CO2, and NH3.

5. The apparatus of claim 1, wherein the driver material includes a liquid.

6. The apparatus of claim 5, wherein the neutron absorption parameter modifying material includes a liquid that is immiscible with the driver material.

7. The apparatus of claim 1, wherein the driver material includes a solid.

8. The apparatus of claim 7, wherein the solid includes at least one solid chosen from a ferritic martensitic steel and a zirconium alloy.

9. The apparatus of claim 1, wherein the nuclear fission reactor thermal operational parameter includes at least one temperature chosen from reactor coolant temperature, reactor coolant vapor temperature, and fuel temperature.

10. The apparatus of claim 1, wherein the nuclear fission reactor thermal operational parameter includes at least one flux chosen from neutron flux, beta flux, gamma flux, and neutrino flux.

11. The apparatus of claim 1, wherein the neutron absorption parameter modifying material includes a neutron absorber.

12. The apparatus of claim 11, wherein the neutron absorber includes at least one neutron absorber chosen from In, Li-6, Eu, Ag, Dy, B, Hf, Gd, Pm, Cd, Sm, binary combinations thereof, and eutectic combinations thereof.

13. The apparatus of claim 11, wherein the neutron absorber includes nuclear fission fuel material.

14. The apparatus of claim 13, wherein the nuclear fission fuel material includes at least one nuclear fission fuel material chosen from U dissolved in Pb, U—Fe, U—Mn, Pu—Mn, U—Cr, Pu—Cr, Pu—Fe eutectic, and Pu—Mg eutectic.

15. The apparatus of claim 1, wherein the neutron absorption parameter modifying material includes a moderator.

16. The apparatus of claim 15, wherein the moderator includes at least one moderator chosen from Li-7, C, SiC, a hydrogenous material, water, ammonia, acetone, a metal hydride, a metal deuteride, a suspension of carbon in water, and a suspension of SiC in water.

17. The apparatus of claim 1, further comprising a high-Z material distributed in the driver material.

18. The apparatus of claim 17, wherein the high-Z material includes at least one material chosen from W wool, Ta, Au, Ag, Re, and Os.

19. The apparatus of claim 1, wherein:
   the driver material has a first density;
   the neutron absorption parameter modifying material has a second density that is different from the first density; and
   the driver material is immiscible with the neutron absorption parameter modifying material.

20. The apparatus of claim 19, wherein the second density is greater than the first density.

21. The apparatus of claim 19, wherein the first density is greater than the second density.

* * * * *